United States Patent [19]

Saive et al.

[11] Patent Number: 5,112,928
[45] Date of Patent: May 12, 1992

[54] PREPARATION OF HOMOPOLYMERS OF ETHENE AND COPOLYMERS OF ETHENE WITH HIGH α-MONOOLEFINS USING A ZIEGLER CATALYST SYSTEM

[75] Inventors: Roland Saive, Ludwigshafen; Guido Funk; Robert Bachl, both of Worms, all of Fed. Rep. of Germany

[73] Assignee: BASF Aktiengesellschaft, Ludwigshafen, Fed. Rep. of Germany

[21] Appl. No.: 416,410

[22] Filed: Oct. 3, 1989

[30] Foreign Application Priority Data

Oct. 7, 1988 [DE] Fed. Rep. of Germany ....... 3834130

[51] Int. Cl.⁵ .................... C08F 4/68; C08F 10/02
[52] U.S. Cl. ................... 526/128; 502/120; 526/129; 526/132; 526/133
[58] Field of Search ................... 526/129, 128

[56] References Cited

U.S. PATENT DOCUMENTS

| | | | |
|---|---|---|---|
| 4,396,534 | 8/1983 | Matsumura et al. | 526/125 |
| 4,472,315 | 9/1984 | Albizzati et al. | 260/429 R |
| 4,508,842 | 4/1985 | Beran et al. | 526/142 |
| 4,710,552 | 12/1987 | Bachl et al. | 526/116 |
| 4,831,090 | 5/1989 | Bachl et al. | 526/116 |
| 4,845,067 | 7/1989 | Kao et al. | 502/119 |
| 4,999,327 | 3/1991 | Kao et al. | 526/128 |

FOREIGN PATENT DOCUMENTS

| | | |
|---|---|---|
| 3136254 | 3/1983 | Fed. Rep. of Germany ...... 526/129 |
| 3417238 | 11/1985 | Fed. Rep. of Germany . |
| 2101611 | 1/1983 | United Kingdom ................ 526/129 |

OTHER PUBLICATIONS

U.S. Serial No. 07/258,762.

*Primary Examiner*—Edward J. Smith
*Attorney, Agent, or Firm*—Keil & Weinkauf

[57] ABSTRACT

The homopolymerization and copolymerization of ethene are carried out using a Ziegler catalyst system consisting of
 (1) a transition metal catalyst component,
 (2) an organoaluminum catalyst component and
 (3) an organohalogen catalyst component.

In the homopolymerization or copolymerization, the solid-phase product (VI) used as (1) is the product which has been obtained by a method in which (1.1) first (1.1.1) an inorganic oxidic substance (I) as the carrier and (1.1.2) a solution (II) of (IIa) a certain oxahydrocarbon and (IIb) a vanadium trichloride/alcohol complex and (IIc) a silicon or boron compound are combined with formation of a suspension (III), the latter is evaporated down to form a solid-phase intermediate (IV), and (1.2) then (1.2.1) the intermediate (IV) obtained in (1.1) and (1.2.2) a dissolved organoaluminum compound (V) are combined with the formation of a suspension, the solid-phase product (VI) obtained as the suspended substance being the transition metal catalyst component (1).

2 Claims, No Drawings

PREPARATION OF HOMOPOLYMERS OF ETHENE AND COPOLYMERS OF ETHENE WITH HIGH α-MONOOLEFINS USING A ZIEGLER CATALYST SYSTEM

The present invention relates to a process for the batchwise and, in particular, continuous preparation of homopolymers of ethene and, in particular, copolymers of ethene with minor amounts of $C_3$–$C_8$-a-monoolefins, in particular $C_4$–$C_6$-a-monoolefins, by polymerization of the monomer or monomers at from 30° to 200° C., in particular from 50° to 125° C., and under from 0.1 to 200, in particular from 5 to 60, bar using a Ziegler catalyst system consisting of (1) a transition metal catalyst component,
(2) an organoaluminum catalyst component of the formula $AlR_mX_{3-m}$, where X is a radical OR, chlorine, bromine or hydrogen, preferably a radical OR or chlorine, R is a $C_1$–$C_{18}$-hydrocarbon radical, in particular $C_1$–$C_{12}$-alkyl, preferably $C_2$–$C_8$-alkyl, and m is from 1 to 3, preferably from 2 to 3, and
(3) an organohalogen catalyst component (=cocatalyst), with the provisos that the atomic ratio of the transition metal from the catalyst component (1) to aluminum from catalyst component (2) is from 1:0.1 to 1:500, preferably from 1:0.2 to 1:50, and the molar ratio of organoaluminum catalyst component (2) to organohalogen catalyst component (3) is from 1:0.0001 to 1:10, preferably from 1:0.01 to 1:0.8.

Polymerization processes of this type are known, and, for example, the process described in U.S. Pat. No. 4,710,552 and that proposed in U.S. Ser. No. 07/258,762 filed Oct. 17, 1988, now abandoned may be regarded as typical in the stated context.

The stated procedure, like other similar procedures, is based on a specially designed Ziegler catalyst system.

It is an object of the present invention to provide a catalyst system which permits the preparation of an ethylene homopolymer or of a copolymer of ethylene with a-olefins, having a controllable molecular weight and molecular weight distribution and excellent morphological properties and gives an extremely high yield.

It is a further object of the present invention to ensure the technical feasibility of the polymerization using the conventional reactor technology.

In this context, it was particularly important to achieve a high yield, since the prior art, for example typified by U.S. Ser. No. 07/258,762, was unsatisfactory in this respect.

We have found that these objects are achieved by a catalyst system which has a special transition metal catalyst component (1), which must be prepared in a certain manner and must contain the transition metal vanadium.

The present invention accordingly relates to a process for the batchwise and, in particular, continuous preparation of homopolymers of ethene and, in particular, copolymers of ethene with minor amounts of $C_3$–$C_8$-a-monoolefins, in particular $C_4$–$C_6$-a-monoolefins, by polymerization of the monomer or monomers at from 30° to 200° C., in particular from 50° to 125° C., and under from 0.1 to 200, in particular from 5 to 60, bar using a Ziegler catalyst system consisting of (1) a transition metal catalyst component,
(2) an organoaluminum catalyst component of the formula $AlR_mX_{3-m}$, where X is a radical OR, chlorine, bromine or hydrogen, preferably a radical OR or chlorine, R is a $C_1$–$C_{18}$-hydrocarbon radical, in particular $C_1$–$C_{12}$-alkyl, preferably $C_2$–$C_8$-alkyl, and m is from 1 to 3, preferably from 2 to 3, and
(3) an organohalogen catalyst component (=cocatalyst), with the provisos that the atomic ratio of the transition metal from the catalyst component (1) to aluminum from catalyst component (2) is from 1:0.1 to 1:500, preferably from 1:0.2 to 1:50, and the molar ratio of organoaluminum catalyst component (2) to organohalogen catalyst component (3) is from 1:0.0001 to 1:10, preferably from 1:0.01 to 1:0.8.

In the novel process, the transition metal catalyst component (1) used is the solid-phase product (VI) which has been obtained by a method in which (1.1) first
(1.1.1) a finely divided, porous, inorganic oxidic substance (I) which has a particle diameter of from 1 to 1000 lm, preferably from 1 to 400 lm, a pore volume of from 0.3 to 3, preferably from 1 to 2.5, cm$^3$/g and a specific surface area of from 100 to 1000, preferably from 200 to 400, m$^2$/g and is of the formula $SiO_2.aAl_2O_3$, where a is from 0 to 2, in particular from 0 to 0.5, and (1.1.2) a solution (II), as obtained on combining (IIa) 100 parts by weight of a saturated aliphatic or partly saturated aliphatic and partly aromatic oxahydrocarbon which has 1 or 2 oxaoxygen atoms, preferably one oxaoxygen atom, and more than 3 but less than 19, preferably more than 3 but less than 11, carbon atoms, in particular a saturated aliphatic cyclic oxahydrocarbon which has one oxaoxygen atom and 4 to 6 carbon atoms, especially tetrahydrofuran, and (IIb) from 0.01 to 50, preferably from 1 to 30, parts by weight of a vanadium trihalide/alcohol complex of the formula $VY_3.nZ$—OH, where Y is chlorine or bromine, preferably chlorine, n is from 1 to 6, preferably from 3 to 4, and Z is a monovalent saturated aliphatic or partly saturated aliphatic and partly aromatic hydrocarbon radical of not more than 10, preferably not more than 8, carbon atoms, in particular alkyl of not more than 6 carbon atoms, and (IIc) from 1 to 200, preferably from 1 to 50, parts by weight of a compound of the type $BX_nY_mR_p$ or $SiX_nY_mR_q$, where X is a radical OR, Y is chlorine, bromine or hydrogen and R is a $C_1$–$C_{18}$-hydrocarbon radical, with the proviso that n is $>0$ and $n+m+p=3$ or $n+m+q=4$, preferably a compound of the type $SiX_nR_q$, where X is a radical OR and R is an aliphatic or aromatic $C_1$–$C_{18}$-hydrocarbon radical, n is $>0$ and $n+q=4$, particularly preferably a compound in which n is 1 and R is a hydrocarbon radical of 1 to 10 carbon atoms, are brought into contact with one another with formation of a suspension (III), with the proviso that the weight ratio of inorganic oxidic substance (I) to transition metal composition (IIb) is from 1:0.01 to 1:2, preferably from 1:0.2 to 1:1.5, and the suspension (III) is evaporated to dryness at a temperature which is below 200° C., preferably below 160° C., and above the melting point of the oxahydrocarbon (IIa) used, with formation of a solid-phase intermediate (IV), and (1.2) then (1.2.1) the solid-phase intermediate (IV) obtained in stage (1.1) and (1.2.2) an aluminum compound (V) which is dissolved in an organic solvent and is of the formula $AlR_mX_{3-m}$, where X is a radical OR, chlorine, bromine or hydrogen, preferably a radical OR or chlorine, R is a $C_1$-$C_{18}$-hydrocarbon radical, particularly $C_1$-$C_{12}$-alkyl, preferably $C_2$-$C_8$-alkyl, and m is from 1 to 3, preferably 2, are brought into contact with one another with formation of a suspension, with the proviso that the weight ratio of solid-phase intermediate (IV) to aluminum compound (V) is from 1:0.05 to 1:2, preferably from 1:0.1 to 1:1, the solid-phase product (VI) obtained as the suspended substance being the transition metal catalyst component (1).

Regarding the novel process, the following may be stated by way of explanation:

Provided that the defining features are taken into account, the polymerization process as such can be carried out in virtually any relevant conventional technological embodiment, for example as a suspension or dry-phase polymerization process. The stated technological embodiments, i.e. the technological variants of the polymerization of olefins by the Ziegler method, are well known from the literature and in practice, so that further description is unnecessary here. All that need be said is that, in the novel process, the components of the catalyst system may be introduced into the polymerization space in a variety of ways, for example (i) the transition metal component (1), the organoaluminum component (2) and the organohalogen component (3) all at the same place, (ii) the transition metal component (1) on the one hand and a mixture of (2) and (3) on the other hand at separate places, which may be particularly advantageous, or (iii) a mixture of the transition metal component (1) and the organohalogen component (3) on the one hand and the organoaluminum component (2) on the other hand at separate places.

The novel process, which is preferably carried out continuously, is suitable for the preparation of homopolymers of ethene, but mainly for the preparation of copolymers of ethene with minor amounts of $C_3$-$C_8$-a-monoolefins, in particular $C_4$-$C_6$-a-monoolefins; the latter may be in the form of individual compounds or in the form of mixtures of two or more individual compounds. a-Monoolefins which are particularly suitable for the copolymerization are the straight-chain ones, such as propene, n-but-1-ene, n-pent-1-ene, n-hex-1-ene, n-hept-1-ene and n-oct-1-ene, n-but-1-ene and n-hex-1-ene (or mixtures of these two a-monoolefins) giving the most useful polymers, in particular those which contain from 0.1 to 10 molar units of the higher a-monoolefin or of the higher a-monoolefins in copolymerized form per 100 molar units of ethene.

The molecular weights of the polymers may be regulated in a relevant conventional manner, in particular using hydrogen as a regulator.

Regarding the transition metal catalyst component (1) to be used in the novel process, the following may be stated specifically:

It is prepared in two stages, which are denoted by (1.1) and (1.2) above and below. In stage (1.1), a finely divided inorganic oxidic substance (I) of the type defined above and a certain solution (II) defined above are brought into contact with one another to form a suspension (III), which is evaporated to dryness with formation of a solid-phase intermediate (IV). In stage (1.2), the latter is brought into contact with a solution of a certain aluminum compound (V) defined above, with formation of a further suspension, the solid-phase product (VI) obtained as the suspended substance being the novel catalyst component (1). The specific procedure is as follows:

Stage (1.1)

The inorganic oxidic substance (I), as such or suspended in an oxahydrocarbon (advantageously an oxahydrocarbon as defined under (IIa) and with a solids content of the suspension of not less than 5% by weight) is combined with the solution (II), and the suspension (III) formed is then evaporated down.

The solution (II) itself can be prepared by a method conventionally used for the preparation of solutions and thus has no special features.

As a final measure in stage (1.1), the suspension (III) is evaporated to dryness, the solid-phase intermediate (IV) being obtained. The procedure adopted here may be the same as that conventionally used for evaporating suspensions under mild conditions, the abovementioned temperature conditions being maintained. This means that it is generally advantageous, and may be essential in the case of relatively high oxahydrocarbons (IIa), to carry out the evaporation under more or less greatly reduced pressure. As a rule of thumb, the parameter pair temperature/pressure should be chosen so that the evaporation process is complete after about 1-10 hours. It is also advantageous to maintain the homogeneity of the treated material continuously during the evaporation; for example, rotary evaporators have proven useful for this purpose. The residual amount of oxahydrocarbons, for example an amount bound by complex formation, generally has no adverse effect on the solid-phase intermediate (IV).

Stage (1.2)

A 0.1-50, preferably about 25, % strength by weight suspension of the solid-phase intermediate (IV) and a 5-80, preferably about 20, % strength by weight solution of the aluminum compound (V) are first prepared in separate batches, suitable suspending agents and solvents being, in particular hydrocarbons, especially relatively low boiling alkanehydrocarbons, such as hexanes, heptanes or gasolines. The suspension and the solution are then combined in a ratio such that the desired weight ratio is obtained. They are generally combined by introducing the solution into the stirred suspension, since this procedure is more practical than the converse one, which is also possible. At from $-25°$ to $120°$ C., in particular from $25°$ to $80°$ C., the formation of the solid-phase product (VI), which is present in suspended form, is complete in the course of from 15 to 600, in particular from 60 to 300, minutes.

This product can advantageously be used directly in the form of the resulting suspension as transition metal catalyst component (1), if necessary after washing by digestion or filtration. If desired, however, it is also possible to isolate the solid-phase product (VI) before using it as catalyst component (1); for example, the following method can be used to effect isolation: the product (VI) is separated from the liquid phase by filtration and is washed with pure liquid (for example a liquid of the type which has also been used as the suspending agent or solvent), after which it is dried, for example under reduced pressure.

Regarding the composition of the transition metal components (1), the following may be stated specifically:

The inorganic oxidic substance (I) to be used in stage (1.1) is in general an aluminosilicate or, in particular, a silica; it is important that it has the required properties. It has been found that the relevant conventional commercial carriers which fulfill the stated specification are suitable.

The solvent (IIa) to be used is a saturated aliphatic or partly saturated aliphatic and partly aromatic oxahydrocarbon which has one or two oxaoxygen atoms, preferably 1 oxaoyxgen atom, and more than 3 but less than 19, preferably more than 3 but less than 11, carbon atoms, in particular a saturated aliphatic cyclic oxahydrocarbon which has one oxaoxygen atom and 4 to 6 carbon atoms, especially tetrahydrofuran. In addition to the last-mentioned substance, other suitable oxahydrocarbons are, for example, ethylene glycol dimethyl ether, anisole, tetrahydropyran and dioxane, the abovementioned order being observed. The oxahydrocarbons can be used in the form of individual compounds or as mixtures of two or more individual compounds.

The vanadium trihalide/alcohol complex (IIb) to be used is of the formula $VY_3 \cdot nZ-OH$, where Y is chlorine or bromine, preferably chlorine, n is from 1 to 6, preferably from 3 to 4, and Z is a monovalent saturated aliphatic or partly saturated aliphatic and partly aromatic hydrocarbon radical of not more than 10, preferably not more than 8, carbon atoms, in particular alkyl of not more than 6 carbon atoms. The parent vanadium trihalide may be one which is conventionally used in Ziegler catalyst systems. Suitable alcohol components are, for example, methanol, ethanol, propan-2-ol, butan-2-ol and 2-methylbutan-2-ol, the abovementioned order being observed. The complexes can be prepared by conventional methods, for example advantageously in situ, e.g. from vanadium trichloride and propan-2-ol in tetrahydrofuran as the solvent, for example according to D. C. Bradley and H. L. Kehta, Can. J. Chem. 40 (1962), 1710-1713; they too can be used in the form of individual compounds or as mixtures of two or more individual compounds.

The silicon or boron compound to be used under (IIc) is of the formula $BX_nY_mR_p$ or $SiX_nY_mR_q$, where X is a radical OR, Y is chlorine, bromine or hydrogen and R is $C_1$-$C_{18}$-hydrocarbon radical, with the proviso that n is >0 and n+m+p=3 or n+m+q=4, preferably of the formula $SiX_nR_q$, where X is a radical OR and R is an aliphatic or aromatic $C_1$-$C_{18}$-hydrocarbon radical, n being >0 and n+q being 4, particularly preferably of the formula $SiX_nR_q$ in which n is >0, n+q=4 and R is a hydrocarbon radical of 1 to 10 carbon atoms; for example, triisopropyl borate, tetrabutyl silicate, toluyltriethoxysilane, phenyltriethoxysilane and dimethyldiethoxysilane are suitable, the abovementioned order being observed; mixtures of such compounds are also suitable.

The aluminum compounds (V) to be used in stage (1.2) may be, for example, a compound of the formula $Al(C_2H_5)_3$, $Al(C_2H_5)_2Cl$, $Al(C_2H_5)_2Br$, $Al(C_2H_5)_{1.5}Cl_{1.5}$, $Al(C_2H_5)_{1.5}Br_{1.5}$, $Al(C_2H_5)Cl_2$, $Al(C_2H_5)Br_2$, $Al(C_4H_9)_3$, $Al(C_4H_9)_2Cl$, $Al(C_4H_9)Cl_2$, $Al(C_2H_5)_2H$, $Al(C_4H_9)_2H$, $Al(C_3H_7)_2(OC_3H_7)$ or $Al(C_2H_5)_{1.5}(OC_2H_5)_{1.5}$ and isoprenylaluminum. It has been found that aluminum compounds of the formulae $C_2H_5AlCl_2$ and $(C_2H_5)_2AlCl$ and isoprenylaluminum are particularly suitable. The aluminum compounds (V) can be used in the form of individual compounds and as mixtures of two or more individual compounds.

Regarding the organoaluminum catalyst component (2), it may be stated that the relevant conventional compounds are suitable for this purpose; examples of suitable individual compounds are those of the formulae $Al(C_2H_5)_3$, $Al(i-C_4H_9)_3$, $Al(n-C_4H_9)_3$ and $Al(C_8H_{17})_3$ and isoprenylaluminum.

Finally, a compound from the following classes of compounds may advantageously be used as organohalogen catalyst compound (3):

(A) Saturated aliphatic halohydrocarbons, suitable individual compounds being those of the formulae $CCl_4$, $CHCl_3$, $CH_2Cl_2$, $CBr_4$, $CHBR_3$, $CFCl_3$, $CF_2Cl_2$ and $CF_3Cl$. Of these, $CCl_4$, $CHCl_3$, $CH_2Cl_2$, and $CF_2Cl_2$ are particularly suitable. $CFCl_3$ is outstandingly suitable.

(B) Olefinically unsaturated aliphatic halohydrocarbons, suitable individual compounds being those of the formulae $CH_2=CHCl$, $CH_2=CCl_2$, $CHCl=CCl_2$, $Cl_2C=CCl_2$, $CH_2=CH-CH_2Cl$, $CCl_2=CCl-CCl_3$, $CH_2=CHBr$ and $CH_2=CH-CH_2Br$. Of these, $CH_2=CHCl$, $CH_2=CCl_2$ and $CH_2=CHBr$ are particularly suitable. $CH_2=CH-CH_2Cl$, $CCl_2=CCl-CCl_3$ and $CH_2=CH-CH_2Br$ are outstandingly suitable.

(C) Acetylenically unsaturated aliphatic halohydrocarbons, suitable individual compounds being those of the formulae $CH\}C\equiv CH_2Cl$, $CH\}C\equiv CH_2Br$, $CH_3\equiv C\}C-CH_2Cl$, $CH_3\equiv C\}C\equiv CH_2Br$, $C_2H_5\equiv C\}C\equiv CH_2Cl$ and $C_{25}\equiv C\}C\equiv CH_2Br$. Of these, $CH_3\equiv C\}C\equiv CH_2Cl$, $CH_3C\}C\equiv CH_2Br$ are particularly suitable. $CH\}C\equiv CH_2Cl$ and $CH\}C\equiv CH_2Br$ are outstandingly suitable.

(D) Aromatic halohydrocarbons, suitable individual compounds being a-chlorotoluene, a,a-dichlorotoluene, a,a,a-trichlorotoluene, diphenylchloromethane, diphenyldichloromethane, triphenylchloromethane, abromotoluene, a,a-dibromotoluene and a,a,a-tribromotoluene. Of these, bromotoluene is particularly suitable. a-Chlorotoluene, a,a-dichlorotoluene and a,a,a-trichlorotoluene are outstandingly suitable.

(E) Saturated aliphatic halogenated ketones, acyl chlorides and carboxylic esters, suitable individual compounds being hexachloroacetone, monochloroacetyl chloride, dichloroacetyl chloride, trichloroacetyl chloride, monobromoacetyl bromide, methyl monochloroacetate, methyl dichloroacetate and methyl dichloroacetate. Of these, dichloroacetyl chloride, trichloroacetyl chloride, methyl trichloroacetate and in particular hexachloroacetone, monochloroacetyl chloride and methyl monochloroacetate are preferred.

(F) Olefinically unsaturated aliphatic halogenated ketones, acyl chlorides and carboxylic esters, suitable individual compounds being chloromethyl vinyl ketone, trichloromethyl vinyl ketone, 1chloroacryloyl chloride, methyl 2,3,4,4-tetrachlorobut-2-enoate, ethyl2,3,4,4-tetrachlorobut-2-enoate, n-butyl 2,3,4,4-tetrachlorobut-2-enoate, methyl perchlorocrotonate and ethyl perchlorocrotonate. Of these, chloromethyl vinyl ketone, trichloromethyl vinyl ketone, methyl perchlorocrotonate and n-butyl 2,3,4,4-tetrachlorobut-2-enoate are noteworthy.

(G) Aromatic halogenated acyl chlorides and carboxylic esters, suitable individual compounds being α-chlorophenylacetyl chloride, methyl α-chlorophenylacetate, ethyl α-chlorophenylacetate, methyl α,α-dichlorophenylacetate and ethyl α,α-dichlorophenylacetate. Of these, α-chlorophenyl acetyl chloride, methyl α-chlorophenylacetate and methylα,α-dichlorophenylacetate and methyl α,α-dichlorophenylacetate are particularly noteworthy.

It has been found that, among the stated classes of compounds, compounds of classes (A), (B), (C) and (D) are most suitable for the purpose according to the invention, followed by (E) and finally (F) and (G). The relevant compounds can be used in the form of individual compounds or as mixtures of two or more individual compounds.

EXAMPLE Preparation of the transition metal catalyst component (1)

Stage (1.1)

(1.1.1) 16 parts by weight of silica ($SiO_2$, particle diameter 20–45 μm, pore volume 1.7 $cm^3/g$, specific surface area 320 $m^2/g$) and (1.1.2) a solution of 100 parts by weight of tetrahydrofuran, 18 parts by weight of a vanadium trihalide/alcohol complex of the formula $VCl_3.4ZOH$, where Z is isopropyl, and 14 parts by weight of $Si(OC_4H_9)_4$ were used as starting materials. These two components were combined, and the resulting suspension was stirred for a short time. Thereafter, the solid-phase intermediate (IV) formed was isolated by expelling the volatile constituents in a rotary evaporator which had been brought to an operating pressure of 10 mbar and an operating temperature of 70° C.

Stage (1.2)

20 parts by weight of the solid-phase intermediate (IV) obtained in stage (1.1) were suspended in 103 parts by weight of n-heptane, after which a solution of 7.2 parts by weight of diethylaluminum chloride in 17 parts by weight of n-heptane was added to this suspension and the resulting suspension was stirred for a short time at 65° C. It was then filtered, and the residue was washed three times with n-heptane and dried under reduced pressure. The solid-phase product (VI) obtained is the catalyst component (1).

Polymerization

A 10 l autoclave was charged with 5 l of isobutane, 0.27 l of but-1-ene, 0.093 g of catalyst component (1), 5 millimoles of triisobutylaluminum as catalyst component (2) and 2 millimoles of trichlorofluoromethane as organohalogen catalyst component (3).

Polymerization was then carried out in the course of 90 minutes, while stirring and using the following parameters, which were kept constant by regulation: ethylene partial pressure 16.5 bar, hydrogen partial pressure 2.0 bar, temperature 80° C.; after this time, the polymerization was stopped by letting down the pressure.

Further data on the copolymer obtained are shown in the Table.

COMPARATIVE EXPERIMENT corresponding to German patent application 37 35 252

Preparation of the transition metal catalyst component (1)

Stage (1.1)

(1.1.1) 16 parts by weight of silica ($SiO_2$, particle diameter 20–45 lm, pore volume 1.7 $cm^3/g$, specific surface area 320 $m^2/g$) and (1.1.2) a solution of 100 parts by weight of tetrahydrofuran, and 18 parts by weight of a vanadium trihalide/alcohol complex of the formula $VCl_3.4ZOH$, where Z is isopropyl were used as starting materials. These two components were combined, and the resulting suspension was stirred for a short time. Thereafter, the solid-phase intermediate (IV) formed was isolated by expelling the volatile constituents in a rotary evaporator which had been brought to an operating pressure of 10 mbar and an operating temperature of 70° C.

Stage (1.2)

20 parts by weight of the solid-phase intermediate (IV) obtained in stage (1.1) were suspended in 103 parts by weight of n-heptane, after which a solution of 7.2 parts by weight of diethylaluminum chloride in 17 parts by weight of n-heptane was added to this suspension and the resulting suspension was stirred for a short time at 65° C. It was then filtered, and the residue was washed three times with n-heptane and dried under reduced pressure. The solid-phase product (VI) obtained is the catalyst component (1).

Polymerization

The polymerization was carried out as in the Example, with the sole exception that, instead of the novel transition metal catalyst component (1), the same weight of the transition metal catalyst component (1) described above was used.

Further data on the copolymer obtained are shown in the Table.

TABLE

| | Yield | | $MF^1$ | $[\eta]^2$ | $Density^3$ | Bulk density | Sieve analysis$^4$ [mm] | | | [% by wt.] |
|---|---|---|---|---|---|---|---|---|---|---|
| | [g] | [g/g of cat. comp. (1)] | [g/10'] | [dl/g] | [g/$cm^3$] | [g/l] | <0.5 | 0.5–1.0 | >1.0 | |
| Example | 1697 | 18200 | 31.7 | 1.13 | 0.951 | 375 | 1.5 | 35.1 | 63.4 | |
| Comp. Exp. | 1240 | 13300 | 25.5 | 1.15 | 0.952 | 385 | 1.7 | 79.5 | 18.6 | |

$^1$According to DIN 53,735, 190° C., 2.16 kp load
$^2$According to DIN 53,728
$^3$According to DIN 53,479
$^4$According to DIN 53,477

The Example shows that the catalyst productivity increases very substantially, with virtually unchanged polymer properties.

We claim:

1. A process for the preparation of homopolymers of ethene and copolymers of ethene with minor amounts of $C_3$—$C_8$-α-monoolefins by polymerization of the monomer or monomers at from 30° to 200° C. and under from 0.1 to 200 bar using a Ziegler catalyst system consisting of
   (1) a transition metal catalyst component and
   (2) an organoaluminum catalyst component of the formula $AlR_mX_{3-m}$, where X is a radical OR, chlorine, bromine or hydrogen, R is a $C_1$–$C_{18}$-hydrocarbon radical, and m is from 1 to 3, and (3) an organohalogen catalyst component, with the provisos that the atomic ratio of the transition metal from the catalyst component (1) to aluminum from catalyst component (2) is from 1:0.1 to 1:500, and the molar ratio of organoaluminum catalyst component (2) to organohalogen catalyst component (3) is from 1:0.0001 to 1:10, wherein the transition metal catalyst component (1) used is the solid-phase product (VI) which has been obtained by a method in which (1.1) first (1.1.1) a finely divided, porous, inorganic oxidic substance (I) which has a particle diameter of from 1 to 1000 μm, a pore volume of from 0.3 to 3 cm$^3$/g and a specific surface area of from 100 to 1000 m$^2$/g and is of the formula $SiO_2 \cdot aAl_2O_3$, where a is from 0 to 2, and (1.1.2) a solution (II), as obtained on combining (IIa) 100 parts by weight of a saturated aliphatic or partly saturated aliphatic and partly aromatic oxahydrocarbon which has 1 or 2 oxaoxygen atoms and more than 3 but less than 19 carbon atoms and (IIb) from 0.01 to 50 parts by weight of a vanadium trihalide/alcohol complex of the formula $VY_3 \cdot nZ$-OH, where Y is chlorine or bromine, n is from 1 to 6 and Z is a monovalent saturated aliphatic or partly saturated aliphatic and partly aromatic hydrocarbon radical of not more than 10 carbon atoms and (IIc) from 1 to 200 parts by weight of a compound of the type $BX_nY_mR_p$ or $SiX_nY_mR_q$, where X is a radical OR, Y is chlorine, bromine or hydrogen and R is a $C_1$–$C_{18}$-hydrocarbon radical, with the proviso that n is >0 and n+m+p=3 or n+m+q=4, are brought into contact with one another with formation of a suspension (III), with the proviso that the weight ratio of inorganic oxidic substance (I) to transition metal composition (IIb) is from 1:0.01 to 1:2, and the suspension (III) is evaporated to dryness at a temperature which is below 200° C. and above the melting point of the oxahydrocarbon (IIa) used, with formation of a solid-phase intermediate (IV), and (1.2) then (1.2.1) the solid-phase intermediate (IV) obtained in stage (1.1) and (1.2.2) an aluminum compound (V) which is dissolved in an organic solvent and is of the formula $AlR_mX_{3-m}$, where X is a radical OR, chlorine, bromine or hydrogen, R is a $C_1$–$C_{18}$-hydrocarbon radical and m is from 1 to 3, are brought into contact with one another with formation of a suspension, with the proviso that the weight ratio of solid-phase intermediate (IV) to aluminum compound (V) is from 1:0.05 to 1:2,2, the solid-phase product (VI) obtained as the suspended substance being the transition metal catalyst component (1).

2. A process as claimed in claim 1, wherein a compound of the type $SiX_nR_q$, where X is a radical OR, R is an aliphatic or aromatic $C_1$–$C_{18}$-hydrocarbon radical and n is >0 and n+q=4, is used in accordance with (IIc).

* * * * *

UNITED STATES PATENT AND TRADEMARK OFFICE
CERTIFICATE OF CORRECTION

PATENT NO.   : 5,112,928

DATED        : May 12, 1992

INVENTOR(S)  : SAIVE et al.

It is certified that error appears in the above-identified patent and that said Letters Patent is hereby corrected as shown below:

<u>Claim 1, Col. 10, Line 27</u>

"1:2,2" should read --1:2--

Signed and Sealed this

Sixth Day of July, 1993

Attest:

MICHAEL K. KIRK

Attesting Officer   Acting Commissioner of Patents and Trademarks